(12) United States Patent
Takahei et al.

(10) Patent No.: US 10,090,797 B2
(45) Date of Patent: Oct. 2, 2018

(54) MOTOR CONTROL APPARATUS

(71) Applicant: Mitsubishi Electric Corporation, Tokyo (JP)

(72) Inventors: Kazuki Takahei, Tokyo (JP); Toshihiro Azuma, Tokyo (JP); Hiroki Uemura, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/525,091

(22) PCT Filed: May 11, 2016

(86) PCT No.: PCT/JP2016/064039
§ 371 (c)(1),
(2) Date: May 8, 2017

(87) PCT Pub. No.: WO2017/195301
PCT Pub. Date: Nov. 16, 2017

(65) Prior Publication Data
US 2018/0198402 A1    Jul. 12, 2018

(51) Int. Cl.
*H02P 29/60* (2016.01)
*H01M 10/625* (2014.01)

(52) U.S. Cl.
CPC .................. *H02P 29/60* (2016.02)

(58) Field of Classification Search
USPC .................. 318/471–473; 388/934
See application file for complete search history.

(56) References Cited

U.S. PATENT DOCUMENTS

| 6,330,806 | B1* | 12/2001 | Beaverson | G05B 19/0426 |
| | | | | 62/201 |
| 9,755,566 | B2 | 9/2017 | Okita | |
| 2010/0111134 | A1 | 5/2010 | Matsumoto | |
| 2014/0118866 | A1 | 5/2014 | Iwami et al. | |
| 2014/0285131 | A1 | 9/2014 | Sasaki | |
| 2015/0102756 | A1 | 4/2015 | Okita | |

(Continued)

FOREIGN PATENT DOCUMENTS

| CN | 104570943 A | 4/2015 |
| JP | 4-71379 A | 3/1992 |

(Continued)

OTHER PUBLICATIONS

International Search Report of PCT/JP2016/064039, dated Aug. 16, 2016. [PCT/ISA/210].

(Continued)

*Primary Examiner* — Bentsu Ro
(74) *Attorney, Agent, or Firm* — Sughrue Mion, PLLC; Richard C. Turner

(57) ABSTRACT

A motor control apparatus that controls a motor equipped with a cooling apparatus includes: an acquisition unit to acquire the temperature of the motor; a drive control unit to drive the motor and output a driving state and an operating condition of the motor as an operation information signal; and a cause determination unit to determine, on the basis of the temperature of the motor and the operation information signal, at least one of a plurality of causes of heat generation as a cause of heat generation by the motor.

8 Claims, 10 Drawing Sheets

(56) References Cited

U.S. PATENT DOCUMENTS

2015/0219109 A1    8/2015  Suwa et al.
2017/0072814 A1*  3/2017  Kwon .................. H01M 10/613

FOREIGN PATENT DOCUMENTS

| | | |
|---|---|---|
| JP | 5-284692 A | 10/1993 |
| JP | 8-223938 A | 8/1996 |
| JP | 2001-129522 A | 5/2001 |
| JP | 2002-345147 A | 11/2002 |
| JP | 2003-009563 A | 1/2003 |
| JP | 2006-254549 A | 9/2006 |
| JP | 4362110 B2 | 11/2009 |
| JP | 2010-136609 A | 6/2010 |
| JP | 2010-193695 A | 9/2010 |
| JP | 5287365 B2 | 9/2013 |
| JP | 2014-093832 A | 5/2014 |
| JP | 2014-187789 A | 10/2014 |
| JP | 5727572 B2 | 6/2015 |
| JP | 2015-146715 A | 8/2015 |

OTHER PUBLICATIONS

Written Opinion of PCT/JP2016/064039, dated Aug. 16, 2016. [PCT/ISA/237].
Communication dated May 3, 2018 from the State Intellectual Property Office of the P.R.C. In counterpart Chinese application No. 201680003966.8.

* cited by examiner

FIG.3

| No. | TIME OF OCCURRENCE | DETERMINATION STATUS | DETERMINATION RESULT | MESSAGE |
|---|---|---|---|---|
| 136 | 9/1 11:28 | DETERMINATION IN PROCESS | COOLING CAPACITY OF COOLING APPARATUS MAY DEGRADE | - |
| 135 | 8/31 11:20 | DETERMINATION COMPLETED | UNSUITABILITY OF OPERATING CONDITION | CHANGE OPERATING CONDITION |
| 134 | 8/20 14:10 | DETERMINATION COMPLETED | DEGRADATION IN COOLING CAPACITY OF COOLING APPARATUS | INSPECT COOLING APPARATUS |
| 133 | 7/12 11:42 | DETERMINATION COMPLETED | ANOTHER | INSPECT MOTOR |
| ⋮ | ⋮ | ⋮ | ⋮ | ⋮ |

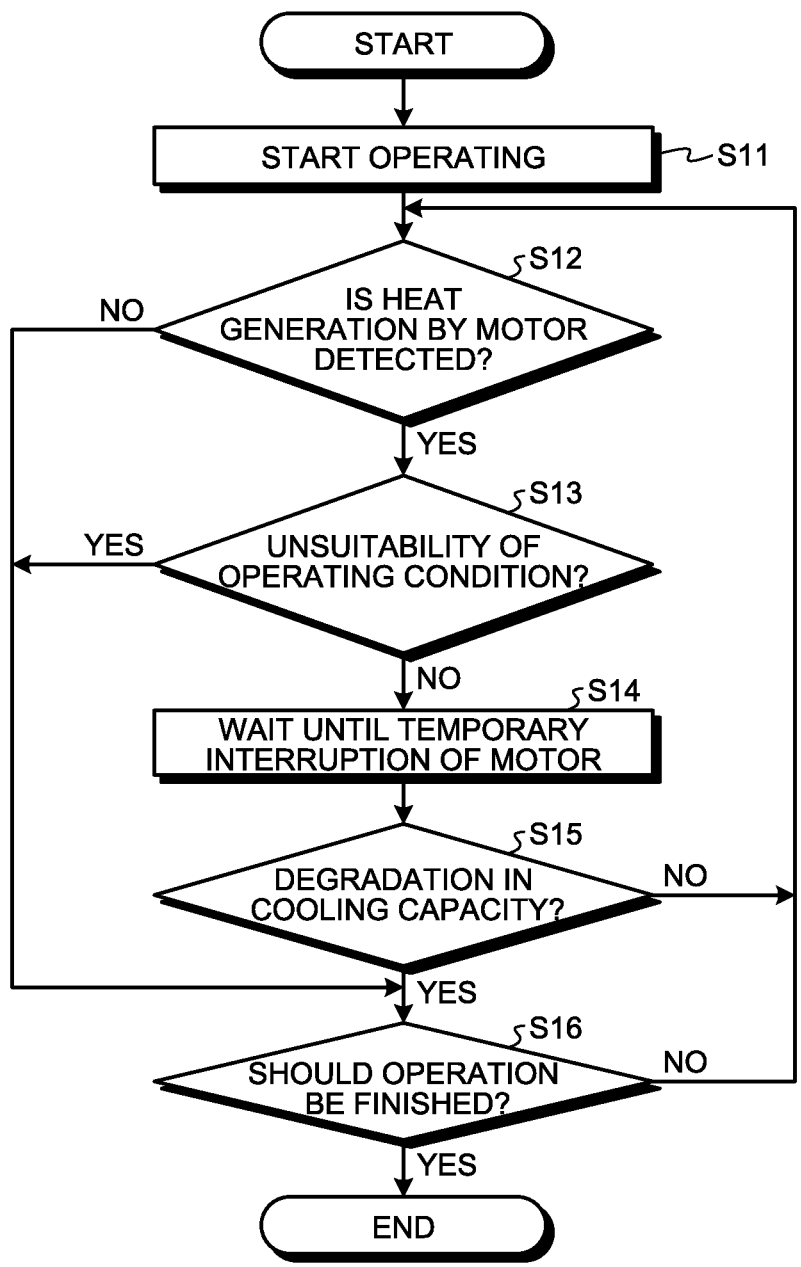

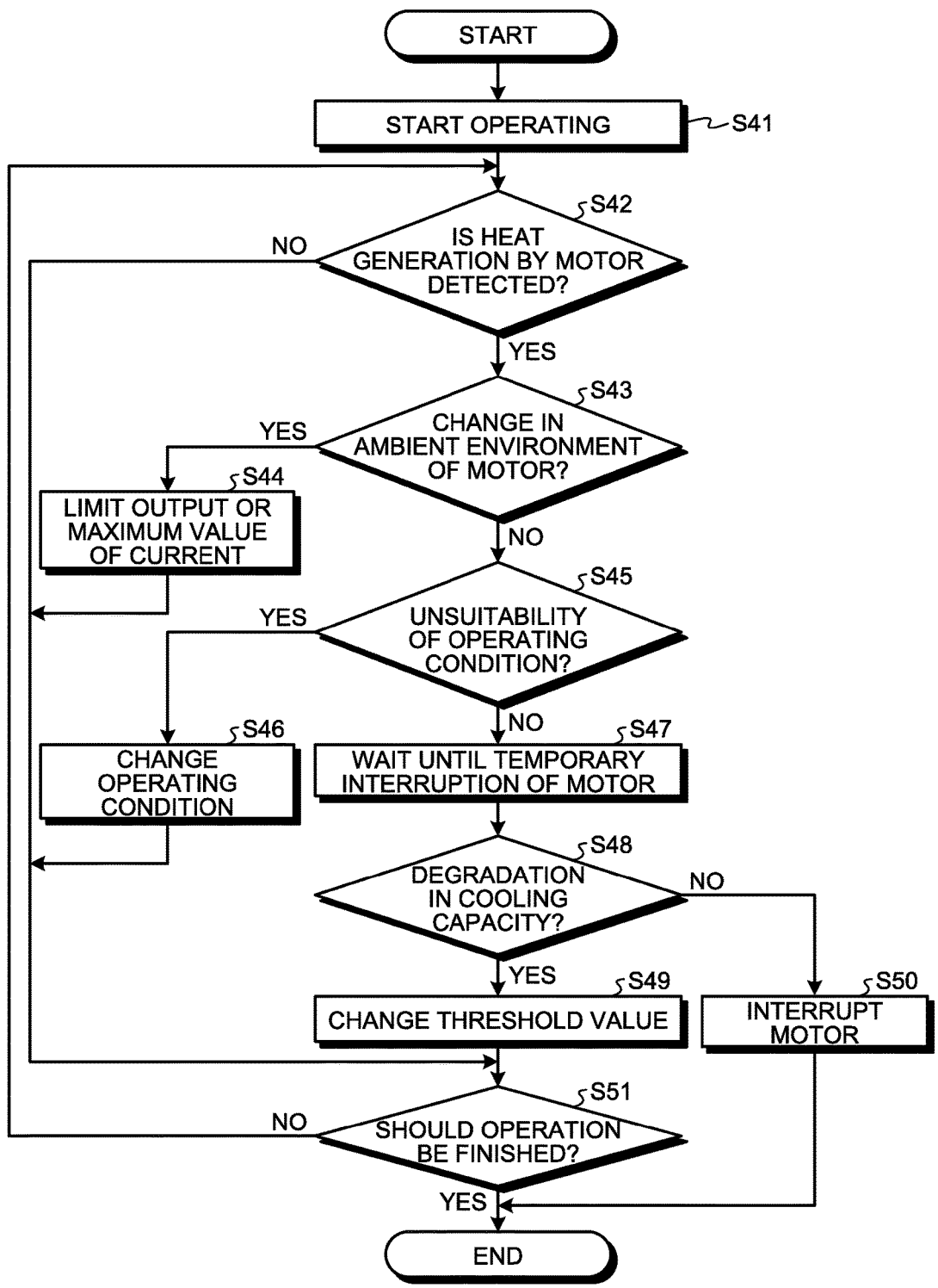

MOTOR CONTROL APPARATUS

CROSS REFERENCE TO RELATED APPLICATIONS

This application is a National Stage of International Application No. PCT/JP2016/064039 filed May 11, 2016, the contents of all of which are incorporated herein by reference in their entirety.

FIELD

The present invention relates to a motor control apparatus that controls a motor equipped with a cooling apparatus.

BACKGROUND

Motors are used widely in industrial apparatuses, and for many such motors, a method is used in which forced cooling is provided by a cooling apparatus in order to mitigate heat generation by the motor. There is, for example, a method in which a cooling fan is attached to a motor to supply cooling air to the motor and thus to forcibly cool the motor. In another method, in which no cooling fan is used, the flow path for the cooling medium is formed in the motor such that the cooling medium in the flow path is circulated by a pump while the cooling medium is cooled by an oil cooler in order to forcibly cool the motor. An apparatus that is an accessory for a motor for forcibly cooling the motor is hereinafter generally referred to as a cooling apparatus.

In many industrial apparatuses, a motor operating condition set for the purpose of maximizing the production efficiency applies a heavy load to the motor; thus, when an operating condition is set that applies, to a motor, a load that is equal to or greater than the cooling capacity of the cooling apparatus, the motor may generate heat. When dust adheres to a cooling apparatus or a flow path is clogged, the cooling capacity may be degraded, which may cause the motor to generate heat under an operating condition that would not originally have been a problem. When a motor generates heat rapidly or the temperature of the motor remains high after heat generation, the motor cannot deliver its original performance. Furthermore, the life of the motor may be reduced and thereby unexpected failure may be caused. Hence, when a motor has generated heat, it is necessary to detect the heat generation early and take an appropriate countermeasure that corresponds to the cause of the heat generation.

With regard to a method of estimating the temperature change amount of a motor, Patent Literature 1 describes a method in which the amount of temperature increase resulting from acceleration and deceleration of a main shaft motor and the amount of temperature increase resulting from cutting performed during a certain rotation are estimated and the operating condition is changed in accordance with the cause of the temperature increase.

CITATION LIST

Patent Literature

Patent Literature 1: JP 5727572 B2

SUMMARY

Technical Problem

The method described in Patent Literature 1 is a method that determines heat generation resulting from the unsuitability of the operating condition of a motor and thus cannot determine the cause if the heat generation is due to the cause other than an operating condition of the motor. Specifically, if the temperature of a motor is increased because the motor is not cooled properly due to degradation in cooling capacity of a cooling apparatus, the method of Patent Literature 1 still allows an action to be performed similar to that performed when the cooling apparatus is normal. It is intrinsically necessary to change the action of an apparatus in accordance with the degradation in cooling capacity of the cooling apparatus; however, the method of Patent Literature 1 determines that every cause of heat generation is an unsuitable operating condition.

Although there is more than one cause that results in heat generation by an apparatus, the method of Patent Literature 1 has only one cause of heat generation set in advance, determines the cause of heat generation, and performs processing to change an action, as described above. That is, the method does not perform a determination that assumes a plurality of causes of heat generation. Exemplary countermeasures against heat generation by a motor include changing the operating condition, cleaning the cooling apparatus, and replacing the motor, which involve different work hours and produce a different effect depending on the cause of the heat generation by the motor. Hence, if a countermeasure is taken without determining the cause, the countermeasure may prove to be ineffective despite the fact that work hours have been spent and another measure may have to be taken. In this case, it is necessary to redo the work of searching for the cause of the heat generation and investigating a countermeasure against the heat generation, which causes degradation of work efficiency.

The present invention has been realized in view of the above, and an object of the present invention is to provide a motor control apparatus that can determine a plurality of causes of heat generation by a motor equipped with a cooling apparatus.

Solution to Problem

In order to solve the above problems and achieve the object, an aspect of the present invention is a motor control apparatus that controls a motor equipped with a cooling apparatus, the motor control apparatus including: an acquisition unit to acquire a temperature of the motor; a drive control unit to drive the motor and output a driving state and an operating condition of the motor as an operation information signal. Furthermore, an aspect of the present invention includes a cause determination unit to determine, on a basis of the temperature of the motor and the operation information signal, at least one of a plurality of causes of heat generation as a cause of heat generation by the motor.

Advantageous Effects of Invention

A motor control apparatus according to the present invention produces an effect of enabling determination of a plurality of causes of heat generation by a motor equipped with a cooling apparatus.

BRIEF DESCRIPTION OF DRAWINGS

FIG. 3 is a diagram illustrating an example of a display in a display apparatus according to the first embodiment.

FIG. 4 is a flowchart illustrating processing performed by the motor control apparatus according to the first embodiment.

FIG. 13 is a flowchart illustrating processing performed by the motor control apparatus according to the fourth embodiment.

DESCRIPTION OF EMBODIMENTS

A motor control apparatus according to embodiments of the present invention will be described below in detail with reference to the drawings. The present invention is not limited to the embodiments.

First Embodiment

Figure 1:
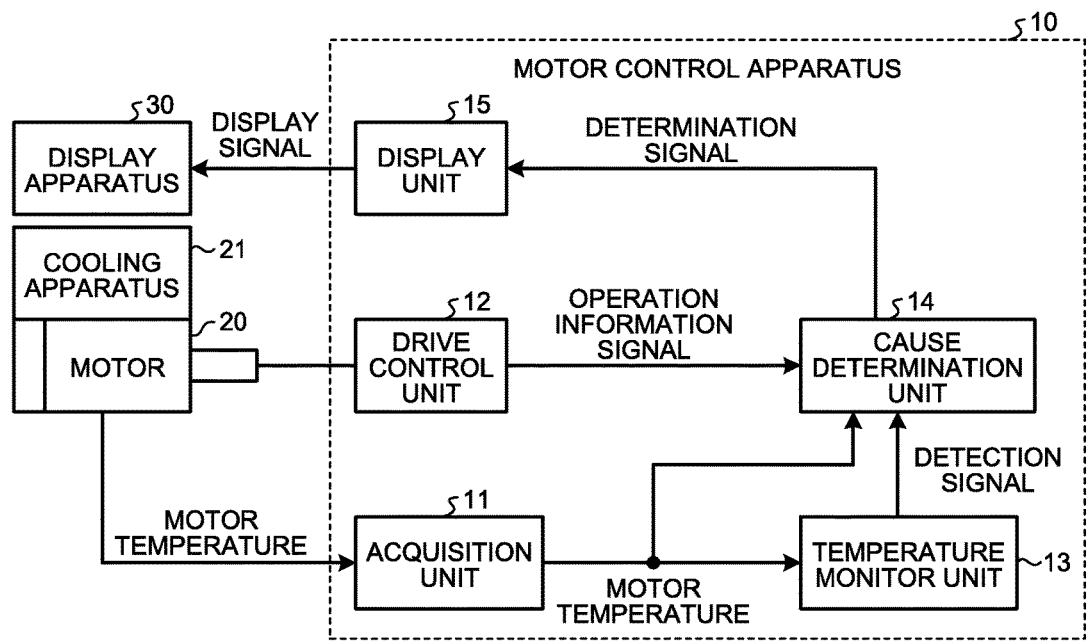
FIG. 1 is a block diagram illustrating the configuration of a motor control apparatus according to a first embodiment of the present invention.

FIG. 1 is a block diagram illustrating the configuration of a motor control apparatus 10 according to a first embodiment of the present invention. The motor control apparatus 10 is connected to a motor 20, which is equipped with a cooling apparatus 21, and a display apparatus 30 and controls the motor 20. The motor control apparatus 10 also acquires the motor temperature, which is the temperature of the motor 20, and, when heat generation by the motor 20 is detected, displays, on the display apparatus 30, information related to a cause determination of the heat generation by the motor 20. Here, specific examples of the cooling apparatus 21 include a cooling fan, an oil cooler for water cooling or oil cooling, and a pump. The cooling apparatus 21 operates to cool the motor 20 at all times regardless of the rotation or interruption of the motor 20. Specific examples of the display apparatus 30 include a screen display apparatus that is installed near the motor control apparatus 10 and an information terminal, such as a personal computer or a tablet, that is present in a remote location.

The motor control apparatus 10 supplies a current to the motor 20 so as to drive the motor 20 and acquires a driving state, which includes a current, an output, a speed, and a position of the motor 20, and the motor temperature. The motor control apparatus 10 includes an acquisition unit 11, which acquires the motor temperature; a drive control unit 12, which drives the motor 20; a temperature monitor unit 13, which monitors the motor temperature; a cause determination unit 14, which determines the cause of heat generation by the motor 20; and a display unit 15, which outputs a display signal to the display apparatus 30.

Figure 2:
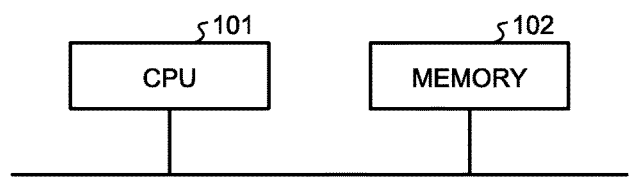
FIG. 2 is a diagram illustrating the hardware configuration of the motor control apparatus according to the first embodiment to a fourth embodiment in a case in which the functions of the motor control apparatus are realized by a computer.

FIG. 2 is a diagram illustrating the hardware configuration of the motor control apparatus according to the first embodiment to a fourth embodiment in a case in which the functions of the motor control apparatus are realized by a computer. When the functions of the motor control apparatus 10 are realized by a computer, the functions of the motor control apparatus 10 are realized by a CPU (Central Processing Unit) 101 and a memory 102, as illustrated in FIG. 2. The functions of the motor control apparatus 10 are realized by software, firmware, or a combination of software and firmware. The software or the firmware is described as a program and stored in the memory 102. The CPU 101 reads the program stored in the memory 102 and executes the program to realize the functions of each of the units of the motor control apparatus 10. That is, the motor control apparatus 10 includes the memory 102 for storing a program that, when the function of each of the units is executed by the computer, causes a step of performing an action of the motor control apparatus 10 to be executed. To put it in other words, such programs cause the computer to execute a procedure or a method of the motor control apparatus 10. Here, the memory 102 also stores an operating program of the motor 20. The memory 102 corresponds to a nonvolatile or volatile semiconductor memory, such as a RAM (Random Access Memory), a ROM (Read Only Memory), a flash memory, an EPROM (Erasable Programmable Read Only Memory), and an EEPROM (Electrically Erasable Programmable Read Only Memory), a magnetic disk, a flexible disk, an optical disc, a compact disc, a mini disc, and a DVD (Digital Versatile Disk).

The function of each of the units of the motor control apparatus 10 will be described below in detail.

The acquisition unit 11 is connected to a sensor that measures the temperature of the motor 20 and acquires the motor temperature at each time. The acquisition unit 11 outputs the acquired motor temperature to the temperature monitor unit 13 and the cause determination unit 14.

The drive control unit 12 is connected to the motor 20 and drives the motor 20. The drive control unit 12 has the operating condition of the motor 20 set therein in advance by the operating program. The drive control unit 12 controls the motor 20 such that the motor 20 is operated on the basis of the operating condition that has been set. The drive control unit 12 monitors the driving state of the motor 20. The drive control unit 12 outputs, to the cause determination unit 14, the driving state of the motor 20 and the operating condition of the motor 20 set in the drive control unit 12 as an operation information signal. Here, the operation of the motor 20 refers to a series of actions of the motor 20 including driving and temporary interruption of the motor 20. Hence, the operating condition of the motor 20 represents conditions such as an output, a current, an acceleration, an acceleration/deceleration time constant, and an operation time that are defined by a series of driving commands and interruption commands for causing the motor 20 to achieve a target operation.

The temperature monitor unit 13 monitors the motor temperature, acquired by the acquisition unit 11, of the motor 20 during its operation and outputs a detection signal to the cause determination unit 14 if heat generation by the motor 20 is detected. The temperature monitor unit 13 has a heat-generation detection threshold value set therein. The heat-generation detection threshold value is a value for detecting the possibility of abnormal heat generation by the motor 20, and it is a value set with reference to the heat generation that occurs during a reference operation considered to have no anomalies. The temperature monitor unit 13 calculates an increase amount of the motor temperature of the motor 20 during its operation from the start of the operation and compares the resultant increase amount to the heat-generation detection threshold value. If the change amount of the motor temperature exceeds the heat-generation detection threshold value, the temperature monitor unit 13 determines that the motor 20 has generated heat and outputs a detection signal to the cause determination unit 14. In place of the increase amount of the motor temperature, the time rate of change of the motor temperature may be used and compared to a threshold value to detect heat generation by the motor 20. Furthermore, detection methods other than those described above include a method in which heat generation by the motor 20 is determined if the variation in temperature with respect to the temperature of the motor 20 during a reference operation exceeds a predetermined amount.

Upon receipt of the detection signal output by the temperature monitor unit 13, the cause determination unit 14 determines the cause of the heat generation by the motor 20 on the basis of the motor temperature and the operation information signal and outputs a determination signal including information on the internal state of the cause determination unit 14 to the display unit 15. The internal state of the cause determination unit 14 includes a determination status of the cause determination unit 14, a determination result, and a countermeasure that corresponds to the cause of the heat generation. The cause determination unit 14 determines the cause of heat generation by the motor 20, detected by the temperature monitor unit 13, on the basis of the operation information signal output by the drive control unit 12 and the motor temperature acquired by the acquisition unit 11. A determination method in the cause determination unit 14 for each determination result will be described below.

The cause determination unit 14 determines whether the operating condition set in the drive control unit 12 is unsuitable with respect to the specifications of the motor 20 on the basis of the driving state of the motor 20 during its operation. The cause determination unit 14 calculates an operating-condition determination time width on the basis of the operation information signal. The operating-condition determination time width is a time width for determining the operating condition for the motor 20, and it is a value that represents the time for the motor 20 to perform the operation described in the operating program and that is estimated on the basis of the operating condition. Alternatively, a fixed value may be set as the operating-condition determination time width. Furthermore, the cause determination unit 14 has an operating-condition determination threshold value set therein in advance. The operating-condition determination threshold value is a reference value for determining whether the operation of the motor 20 in the operating-condition determination time width is unsuitable with respect to the specifications of the motor 20. The cause determination unit 14 determines that the cause of the heat generation by the motor 20 is "unsuitability of the operating condition" set in the drive control unit 12 if the mean value of the output of the motor 20 during the operation in the operating-condition determination time width is equal to or greater than the operating-condition determination threshold value. Here, the output of the motor 20 is a physical quantity corresponding to the product of the rotation speed and the torque of the motor 20. More than one combination of the operating-condition determination time width and the operating-condition determination threshold value can be set. In this case, it is determined that the cause of the heat generation by the motor 20 is "unsuitability of the operating condition" if the mean value of the output of the motor 20 calculated from any one of the operating-condition determination time widths is equal to or greater than one of the operating-condition determination threshold values that corresponds to the one of the operating-condition determination time widths. In place of the output of the motor 20, a torque current during the operation of the motor 20 may be used for the determination.

In addition to the determination described above, the cause determination unit 14 determines whether the cooling capacity of the cooling apparatus 21 has degraded on the basis of the motor temperature during an interruption of the motor 20. The cause determination unit 14 has a cooling-apparatus determination time width and a cooling-apparatus determination threshold value set therein in advance. The cooling-apparatus determination time width is a time width taken to determine degradation in cooling capacity. The cooling-apparatus determination threshold value is a reference value for determining whether the cooling capacity of the cooling apparatus 21 has degraded on the basis of a change in temperature of the motor 20 in the cooling-apparatus determination time width. The cause determination unit 14 determines that the cause of the heat generation by the motor 20 is "degradation in cooling capacity" of the cooling apparatus 21 if a decrease amount of the motor temperature after the elapse of the cooling apparatus determination time width with the motor 20 either interrupted temporarily or having finished operating is equal to or less than the cooling-apparatus determination threshold value. In place of the decrease amount of the motor temperature, the time rate of change of the motor temperature may be compared to a threshold value for the determination. Furthermore, detection methods other than those described above include a method in which "degradation in cooling capacity" of the cooling apparatus 21 is determined if variation in temperature with respect to the temperature of the motor 20 during a normal operation of the cooling apparatus 21 exceeds a predetermined amount.

If the cause of the heat generation by the motor 20 is not "unsuitability of the operating condition" or "degradation in cooling capacity" of the cooling apparatus 21, the cause determination unit 14 determines that the cause is "another cause".

The display unit 15 outputs information related to the determination of the cause of the heat generation by the motor 20 as a display signal to the display apparatus 30 on the basis of the determination signal input from the cause determination unit 14. The display signal includes information that the detection signal has been input from the temperature monitor unit 13. The display signal is a signal that also includes at least one of information related to a determination status in the cause determination unit 14, information related to a determination result in the cause determination unit 14, and information related to a countermeasure that corresponds to the cause of the heat generation.

FIG. 3 is a diagram illustrating an example of a display in the display apparatus 30 according to the first embodiment. The columns displayed in FIG. 3, from left to right, are "No.", which is the number of heat generation detection, "time of occurrence" of heat generation detection, "determination status" of the cause, "determination result" of the cause, and "message", which indicates the countermeasure against each cause.

The "time of occurrence" of heat generation detection is the time when the cause determination unit 14 receives a detection signal from the temperature monitor unit 13. The "determination status" of the cause is the determination status inside the cause determination unit 14, and is a state of "determination completed," in which determination has been finalized, or "determination in process," in which determination has not been finalized. The "determination result" of the cause represents the result of the cause determination finalized in the cause determination unit 14. The "message," which indicates a countermeasure against each cause, represents a countermeasure that corresponds to the result of a determination by the cause determination unit 14 and that should be taken by an operator.

In the example of FIG. 3, for "No. 136," which is the latest heat generation, "determination in process" is displayed in the "determination status" and hence "cooling capacity of cooling apparatus may degrade" is displayed in the "determination result". Because the determination is not finalized, nothing is displayed in the "message". For "No. 135" and earlier numbers, "determination completed" is displayed in the "determination status" and hence "unsuitability of operating condition", "degradation in cooling capacity of cooling apparatus", or "other" is displayed in the "determination result". Because the determination is finalized, if the "determination result" is "unsuitability of operating condition", "change operating condition" is displayed in the "message", and if the "determination result" is "degradation in cooling capacity of cooling apparatus", "inspect cooling apparatus" is displayed in the "message". If the "determination result" is "other", "inspect motor" is displayed in the "message".

FIG. 4 is a flowchart illustrating processing performed by the motor control apparatus 10 according to the first embodiment.

First, in step S11, the drive control unit 12 causes the motor 20 to start operating on the basis of the operating condition.

Then, the temperature monitor unit 13 determines in step S12 whether heat generation by the motor 20 that is operating is detected. If heat generation by the motor 20 is detected (step S12: Yes), the flowchart proceeds to step S13. If heat generation by the motor 20 is not detected (step S12: No), the flowchart proceeds to step S16.

The cause determination unit 14 determines in step S13 whether the cause of the heat generation by the motor 20 is unsuitability of the operating condition in the drive control unit 12 on the basis of the driving state of the motor 20. If the cause determination unit 14 determines that the cause is the unsuitability of the operating condition (step S13: Yes), the flowchart proceeds to step S16. If the cause determination unit 14 determines that the cause is not the unsuitability of the operating condition (step S13: No), the flowchart proceeds to step S14.

In order to determine whether the cooling capacity of the cooling apparatus 21 has degraded, the cause determination unit 14 waits in step S14 until the motor 20 is interrupted temporarily.

In step S15, the cause determination unit 14 determines, during a temporary interruption of the motor 20 and on the basis of the motor temperature, whether the cause of the heat generation by the motor 20 is a degradation in the cooling capacity of the cooling apparatus 21. If the cause determination unit 14 determines that the cause is the degradation in cooling capacity (step S15: Yes), the flowchart proceeds to step S16. If the cause determination unit 14 determines that the cause is not the degradation in cooling capacity (step S15: No), the cause determination unit 14 determines that the cause of the heat generation by the motor 20 is another cause. The flowchart then returns to step S12, where the temperature monitor unit 13 determines again whether heat generation by the motor 20 is detected.

The drive control unit 12 determines in step S16 whether to cause the motor 20 to finish operating. If the drive control unit 12 causes the motor 20 to finish operating (step S16: Yes), the motor control apparatus 10 finishes the processing. If the drive control unit 12 causes the motor 20 to continue operating (step S16: No), the flowchart returns to step S12, where the temperature monitor unit 13 determines again whether heat generation by the motor 20 is detected.

In the processing in step S15, where the cause determination unit 14 determines, during a temporary interruption of the motor 20, whether the cooling capacity of the cooling apparatus 21 has degraded, if the motor 20 is not temporarily interrupted longer than the cooling-apparatus determination time width during the operation, the next processing is performed without performing the determination in step S15. That is, a branch is provided before step S15. In this branch, if the motor 20 is not temporarily interrupted longer than the cooling-apparatus determination time width during the operation, processing is performed in which the cause determination unit 14 determines whether the cooling capacity has degraded after the finish of the operation in step S16. If the motor 20 is temporarily interrupted longer than the cooling-apparatus determination time width during the operation, processing is performed in which the cause determination unit 14 determines whether the cooling capacity has degraded during the temporary interruption in accordance with FIG. 4.

As described above, in the motor control apparatus 10 according to the first embodiment, when the temperature monitor unit 13 detects heat generation by the motor 20, the cause determination unit 14 determines the cause of the heat generation by the motor 20. The cause determination unit 14 outputs to the display apparatus 30 the "determination status" of the cause, the "determination result", and the "message" that indicates a countermeasure that corresponds to the "determination result" in accordance with the analysis. That is, when heat generation by the motor 20 is detected, the motor control apparatus 10 presents to an operator information that the heat generation by the motor 20 is detected, the determination status related to the cause determination, the determination result, and the countermeasure that corresponds to the cause of the heat generation.

That is, when heat generation by the motor 20 is detected, the motor control apparatus 10 according to the first embodiment can determine which one or more of the causes of heat generation are a cause or causes of the heat generation by the motor 20 on the basis of temperature information or operation information and thereby produce an effect of allowing an operator to take an appropriate measure or measures that correspond to the cause or causes of the heat generation. When heat generation by the motor 20 occurs, the time taken to search for the cause or causes of the heat generation and the time taken to think about countermeasures against the cause or causes of the heat generation can be reduced; thus, the operator can take an appropriate countermeasure or countermeasures that correspond to the cause or causes of the heat generation immediately. Hence, the work efficiency of the operator can be improved.

In the first embodiment, the information related to the cause determination is displayed collectively in the tabular format as illustrated in FIG. 3, although the display method is not limited to the format in FIG. 3. A display method may be used in which the information related to the cause determination may be categorized in accordance with the determination results. A method may be used in which the display unit 15 diagrammatically indicates the motor control apparatus 10, the motor 20, and the cooling apparatus 21 together on the screen of the display apparatus 30 and, when heat generation by the motor 20 is detected and the cause determination is completed, displays the message alongside the component that has caused the heat generation such that the component is highlighted. Furthermore, the message concerning a countermeasure against a determined cause of heat generation is not limited to the messages in FIG. 3, and different messages for different causes of heat generation may be displayed as appropriate. Specifically, instead of displaying "change operating condition" as in FIG. 3, a presently set operating condition and a recommended operating condition may be displayed side by side. Additionally, instead of displaying "inspect cooling apparatus" as in FIG. 3, a message of "replace cooling apparatus" may be displayed. Additionally, instead of displaying "inspect motor" as in FIG. 3, a message of "replace motor" may be displayed.

The flowchart in FIG. 4 indicates that the order of the processing to determine the cause is performed first with a determination of whether the operating condition is unsuitable, and then with a determination of whether the cooling capacity has degraded. The order in which the determination of the cause of heat generation is performed by the motor control apparatus 10 according to the first embodiment is not limited to that illustrated in FIG. 4, and the order of the determination may be reversed. Furthermore, the number of determination results of the cause of heat generation does not need to be only one, and the flowchart may proceed to step S14 regardless of the determination result in step S13 to also determine whether the cooling capacity has degraded, whereby the motor control apparatus 10 may determine that there are multiple causes of heat generation, i.e., "unsuitability of the operating condition" and "degradation in cooling capacity".

Second Embodiment

Figure 5:
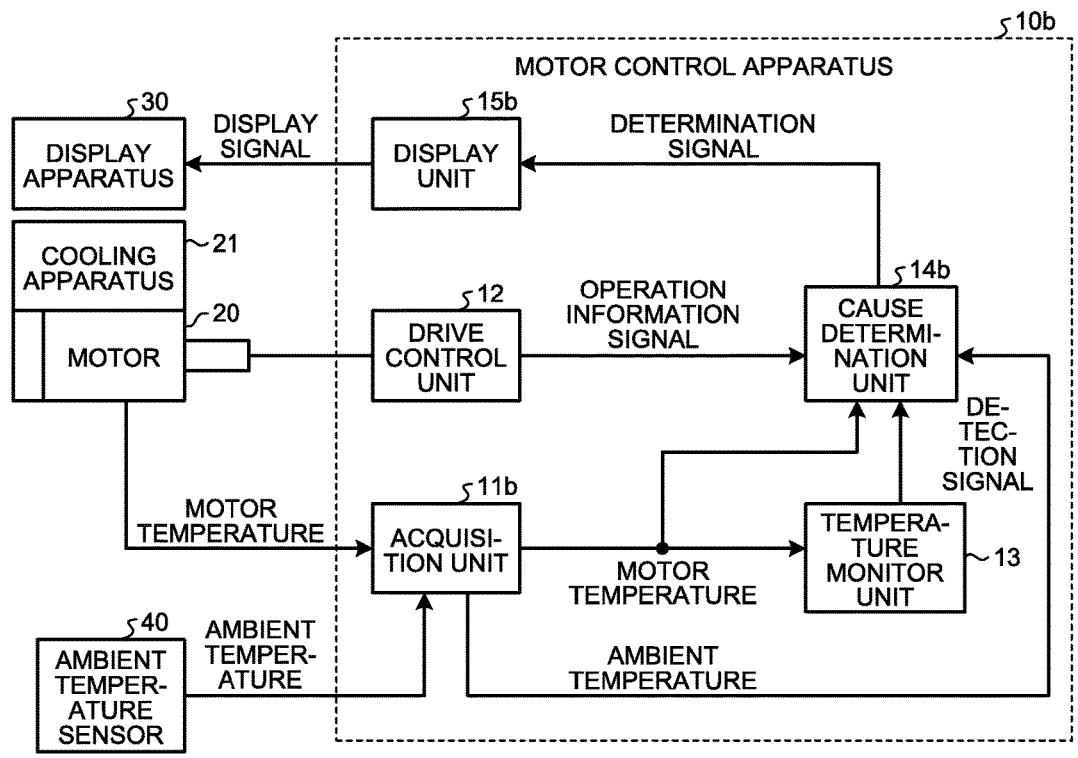
FIG. 5 is a block diagram illustrating the configuration of a motor control apparatus according to a second embodiment of the present invention.

FIG. 5 is a block diagram illustrating the configuration of a motor control apparatus 10b according to a second embodiment of the present invention. In FIG. 5, components identical or similar to those illustrated in FIG. 1 according to the first embodiment are designated with identical symbols. In FIG. 5, an ambient temperature sensor 40 is provided as an addition to the configuration in FIG. 1. The ambient temperature sensor 40 is connected to the motor control apparatus 10b. The ambient temperature sensor 40 is a sensor that measures the temperature surrounding the motor 20. When the functions of the motor control apparatus 10b are realized by a computer, the functions of the motor control apparatus 10b are realized by the CPU 101 and the memory 102, as illustrated in FIG. 2.

Actions of an acquisition unit 11b, a cause determination unit 14b, and a display unit 15b are different in the second embodiment from those in the first embodiment, and thus, description related to these actions will be mainly provided below.

The acquisition unit 11b, which is connected to a sensor that measures the temperature of the motor 20 and to the ambient temperature sensor 40, acquires the motor temperature and the ambient temperature at each time. The acquisition unit 11b outputs the acquired motor temperature to the temperature monitor unit 13 and the cause determination unit 14b. The acquisition unit 11b also outputs the acquired ambient temperature to the cause determination unit 14b.

Upon receipt of a detection signal output by the temperature monitor unit 13, the cause determination unit 14b determines the cause of the heat generation by the motor 20 on the basis of the motor temperature, the ambient temperature, and the operation information signal and outputs a determination signal including information on the internal state of the cause determination unit 14b to the display unit 15b. The internal state of the cause determination unit 14b includes a determination status in the cause determination unit 14b, a determination result, and a countermeasure that corresponds to the cause of the heat generation. The cause determination unit 14b determines the cause of heat generation by the motor 20, detected by the temperature monitor unit 13, on the basis of the operation information signal output by the drive control unit 12 and the motor temperature acquired by the acquisition unit 11b. A determination method in the cause determination unit 14b for each determination result will be described below.

Upon receipt of the detection signal output by the temperature monitor unit 13, the cause determination unit 14b determines whether the ambient environment of the motor 20 has changed on the basis of the ambient temperature that has been input. The cause determination unit 14b has an ambient-environment determination threshold value set therein in advance that serves as a reference for determining that the ambient temperature is the cause of the heat generation by the motor 20. In addition to the determination of "unsuitability of the operating condition" for the motor 20 and "degradation in cooling capacity" of the cooling apparatus 21 performed by the cause determination unit 14 in the first embodiment, the cause determination unit 14b has "change in ambient environment" of the motor 20 and "deterioration" of a main body of the motor 20 that are to be determined. If the ambient temperature is equal to or greater than the ambient-environment determination threshold value, it is determined that the cause of the heat generation by the motor 20 is an increase in ambient temperature due to "change in ambient environment" of the motor 20.

If the cause of the heat generation by the motor 20 is not "change in ambient environment" of the motor 20, "unsuitability of the operating condition", or "degradation in cooling capacity" of the cooling apparatus 21, the cause determination unit 14b determines that the cause is "deterioration" of the main body of the motor 20.

The display unit 15b outputs information related to the cause determination of the heat generation by the motor 20 as a display signal to the display apparatus 30 on the basis of the determination signal input from the cause determination unit 14b. The display signal includes information that the temperature monitor unit 13 has detected heat generation by the motor 20, a determination status in the cause determination unit 14b, a determination result in the cause determination unit 14b, and a countermeasure that corresponds to the cause of the heat generation.

Figure 6:
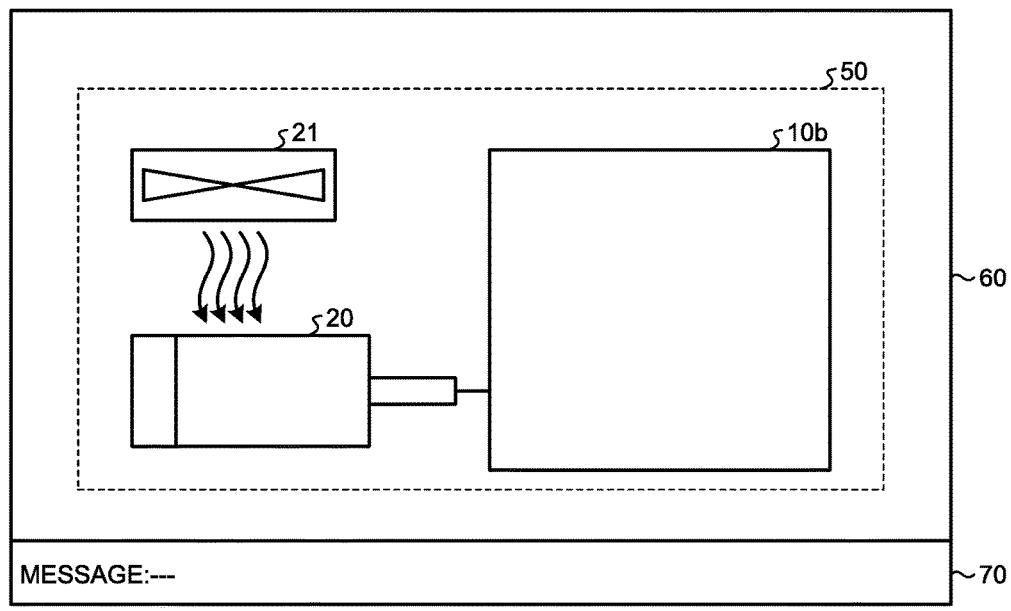
FIG. 6 is a diagram illustrating an example of a display in a display apparatus according to the second embodiment.
Figure 7:
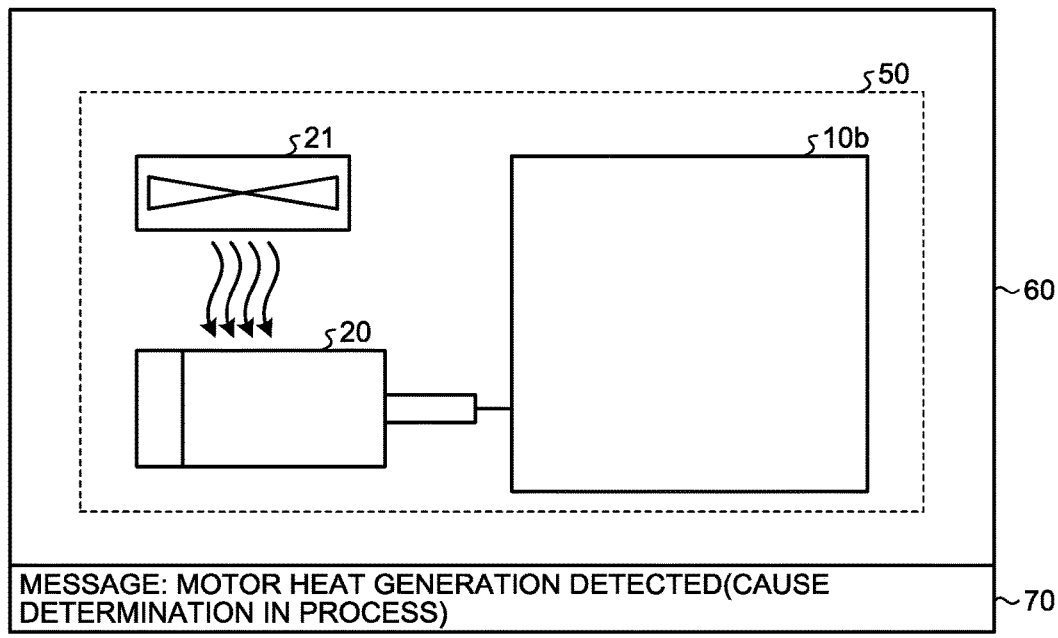
FIG. 7 is a diagram illustrating an example of a display in the display apparatus according to the second embodiment.
Figure 8:
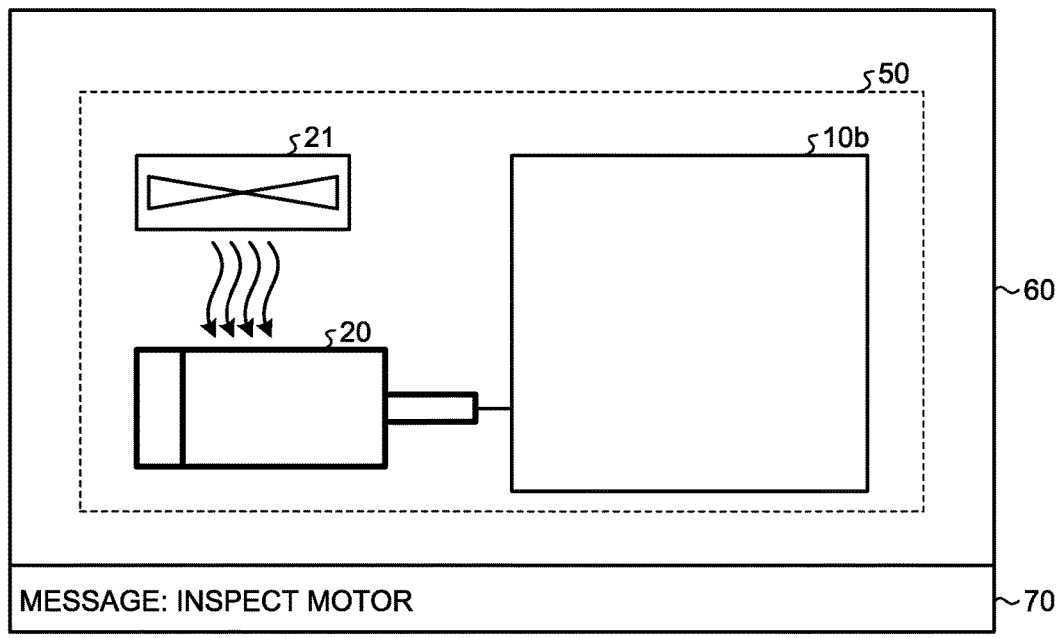
FIG. 8 is a diagram illustrating an example of a display in the display apparatus according to the second embodiment.

FIG. 6 to FIG. 8 are diagrams each illustrating an example of a display in the display apparatus 30 according to the second embodiment. Each of the diagrams in FIG. 6 to FIG. 8 indicates a schematic diagram field 60, which schematically indicates the motor control apparatus 10b, the main body of the motor 20, the cooling apparatus 21, and a motor ambient environment 50, which are major causes of heat generation by the motor 20, and a message field 70, which displays a message corresponding to a determination status and a determination result for an operator. FIG. 6 is a diagram illustrating an example of a display in a case in which heat generation by the motor 20 is undetected, FIG. 7 is a diagram illustrating an example of a display in a case in which heat generation by the motor 20 has been detected and cause determination is in process, and FIG. 8 is a diagram illustrating an example of a display in a case in which heat generation by the motor 20 has been detected and cause determination is completed.

As illustrated in FIG. 6, when heat generation by the motor 20 is undetected, a message related to cause determination is not displayed. As illustrated in FIG. 7, when heat generation by the motor 20 is detected but cause determination is in process, cause determination processing is not completed, and thus, "motor heat generation detected (cause determination in process)" is displayed.

As illustrated in FIG. 8, in the example in which heat generation by the motor 20 is detected, cause determination is completed, and it is determined that the cause of the heat generation is the main body of the motor 20, the main body of the motor 20 is highlighted in the schematic diagram field 60 and a message "inspect motor", which is the countermeasure when the cause of the heat generation is the deterioration of the main body of the motor 20, is displayed in the message field 70. The message to be displayed when the cause determination is completed varies with the determination result of the cause. If the determination result is "unsuitability of the operating condition", "change operating condition" is displayed; if the determination result is "degradation in cooling capacity" of the cooling apparatus 21, "inspect cooling apparatus" is displayed; if the determination result is "change in ambient environment" of the motor 20, "inspect ambient environment" is displayed; and if the determination result is "deterioration" of the main body of the motor 20, "inspect motor" is displayed.

Figure 9:
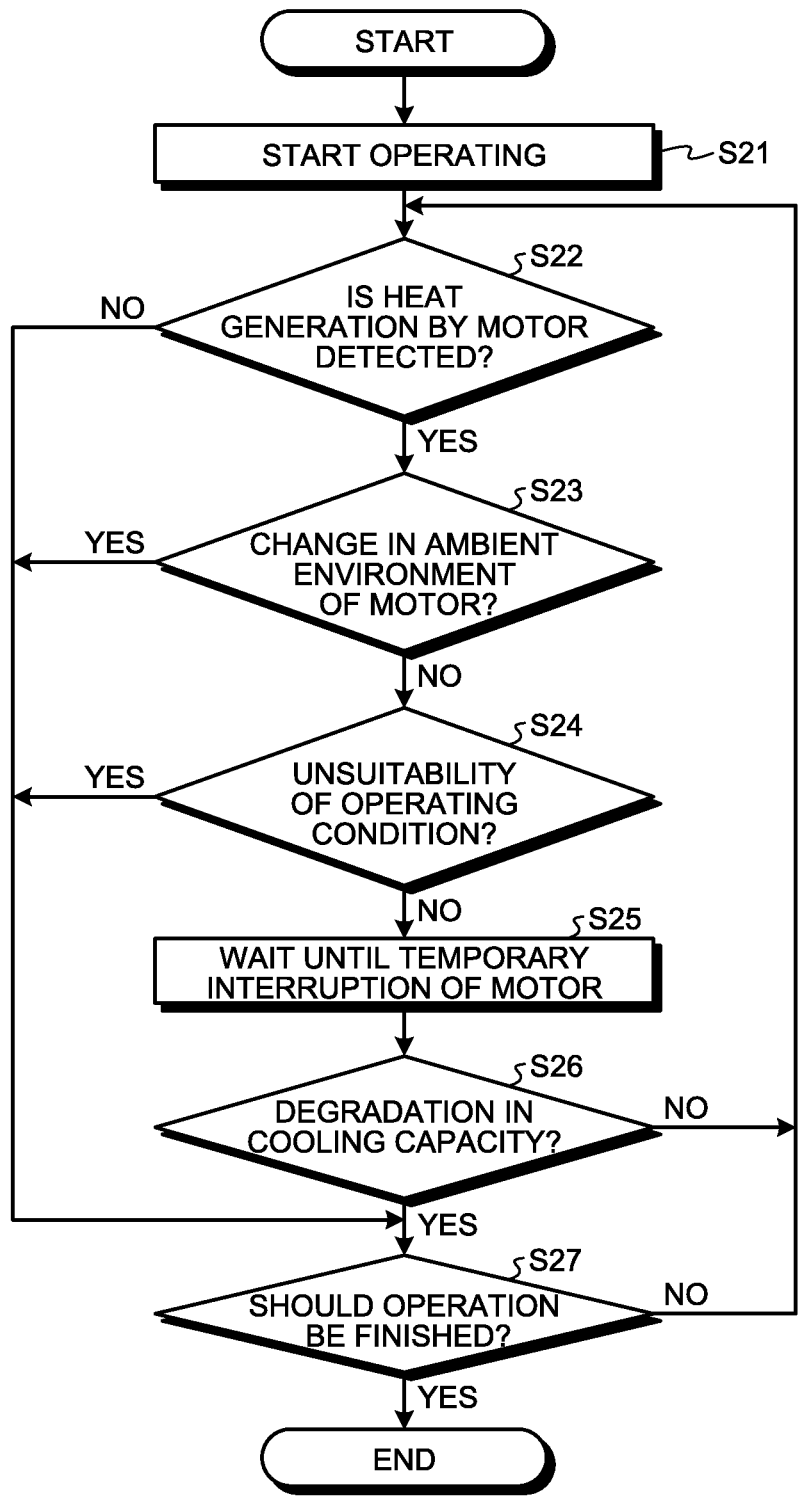
FIG. 9 is a flowchart illustrating processing performed by the motor control apparatus according to the second embodiment.

FIG. 9 is a flowchart illustrating processing performed by the motor control apparatus 10*b* according to the second embodiment.

First, in step S21, the drive control unit 12 causes the motor 20 to start operating on the basis of the operating condition.

Then, the temperature monitor unit 13 determines in step S22 whether heat generation by the motor 20 that is operating is detected. If heat generation by the motor 20 is detected (step S22: Yes), the flowchart proceeds to step S23. If heat generation by the motor 20 is not detected (step S22: No), the flowchart proceeds to step S27.

The cause determination unit 14*b* determines in step S23 whether the cause of the heat generation by the motor 20 is change in ambient environment of the motor 20 on the basis of the ambient temperature. If the cause determination unit 14*b* determines that the cause is the change in ambient environment of the motor 20 (step S23: Yes), the flowchart proceeds to step S27. If the cause determination unit 14*b* determines that the cause is not the change in ambient environment of the motor 20 (step S23: No), the flowchart proceeds to step S24.

The cause determination unit 14*b* determines in step S24 whether the cause of the heat generation by the motor 20 is the unsuitability of the operating condition in the drive control unit 12 on the basis of the driving state of the motor 20. If the cause determination unit 14*b* determines that the cause is the unsuitability of the operating condition (step S24: Yes), the flowchart proceeds to step S27. If the cause determination unit 14*b* determines that the cause is not the unsuitability of the operating condition (step S24: No), the flowchart proceeds to step S25.

In order to determine whether the cooling capacity of the cooling apparatus 21 has degraded, the cause determination unit 14*b* waits in step S25 until the motor 20 is interrupted temporarily.

In step S26, the cause determination unit 14*b* determines, during a temporary interruption of the motor 20 and on the basis of the motor temperature, whether the cause of the heat generation by the motor 20 is the degradation in the cooling capacity of the cooling apparatus 21. If the cause determination unit 14*b* determines that the cause is the degradation in cooling capacity (step S26: Yes), the flowchart proceeds to step S27. If the cause determination unit 14*b* determines that the cause is not the degradation in cooling capacity (step S26: No), the cause determination unit 14*b* determines that the cause of the heat generation by the motor 20 is "deterioration" of the main body of the motor 20. The flowchart then returns to step S22, where the temperature monitor unit 13 determines again whether heat generation by the motor 20 is detected.

The drive control unit 12 determines in step S27 whether to cause the motor 20 to finish operating. If the drive control unit 12 causes the motor 20 to finish operating (step S27: Yes), the processing is finished. If the drive control unit 12 causes the motor 20 to continue operating (step S27: No), the flowchart returns to step S22, where the temperature monitor unit 13 determines again whether heat generation by the motor 20 is detected.

In the processing in step S26, where the cause determination unit 14*b* determines, during a temporary interruption of the motor 20, whether the cooling capacity of the cooling apparatus 21 has degraded, if the motor 20 is not temporarily interrupted longer than the cooling-apparatus determination time width during the operation, the next processing is performed without performing the determination in step S26. That is, a branch is provided before step S26. In this branch, if the motor 20 is not temporarily interrupted longer than the cooling-apparatus determination time width during the operation, processing is performed in which the cause determination unit 14*b* determines whether the cooling capacity has degraded after the finish of the operation in step S27. If the motor 20 is temporarily interrupted longer than the cooling-apparatus determination time width during the operation, processing is performed in which the cause determination unit 14*b* determines whether the cooling capacity has degraded during the temporary interruption in accordance with FIG. 9.

As described above, the motor control apparatus 10*b* according to the second embodiment has a configuration to acquire the ambient temperature from the ambient temperature sensor 40 in addition to the configuration of the motor control apparatus 10 according to the first embodiment. Thus, the motor control apparatus 10*b* according to the second embodiment produces effects to be described below.

Because the motor control apparatus 10*b* acquires the ambient temperature, it can perform the determination with "change in ambient environment" of the motor 20 and "deterioration" of the main body of the motor 20 as candidates for determination results of the cause of heat generation by the motor 20 in addition to the determination results obtained by the cause determination performed in the first embodiment. This enables further detailed determination in comparison with the motor control apparatus 10 according to the first embodiment. Hence, an operator can take a further appropriate countermeasure on the basis of the display on the display apparatus 30.

Additionally, the cause determination unit 14*b* performs the determination of the cause of heat generation by the motor 20 starting with the cause of heat generation that can be determined easily with the motor 20 operating without being interrupted unnecessarily while it is operating; thus, the time taken for the entire determination can be reduced as much as possible.

In the second embodiment, the information related to the cause determination is displayed in a diagrammatic format as illustrated in FIG. 6 to FIG. 8, although the display method is not limited to the format in FIG. 6 to FIG. 8. The display method may be in the tabular format as in FIG. 3 described in the first embodiment. Furthermore, the message concerning a countermeasure against a determined cause of heat generation is not limited to the message indicated in FIG. 8 and different messages for different causes of heat generation may be displayed as appropriate. Specifically, instead of displaying "inspect motor", a message of "replace motor" may be displayed. Additionally, instead of displaying "inspect ambient environment", a message of "increase cooling capacity of cooling apparatus" may be displayed.

The flowchart in FIG. 9 indicates that the order of the processing to determine the cause is performed first with a determination of whether the ambient environment of the motor 20 has changed, then with a determination of whether the operating condition is unsuitable, and then with a determination of whether the cooling capacity has degraded. The order in which the determination of the cause of heat generation is performed by the motor control apparatus 10b according to the second embodiment is not limited to that illustrated in FIG. 9, and the order of the determination may be changed. Furthermore, the number of determination results of the cause of heat generation does not need to be only one, and step S24 may be performed regardless of the determination result in step S23 to determine that multiple causes of heat generation have occurred. In other words, the motor control apparatus 10b may determine any one or more of "change in ambient environment", "unsuitability of the operating condition", and "degradation in cooling capacity", and "deterioration" of the main body of the motor 20 as a cause or causes of heat generation by the motor 20.

Third Embodiment

Figure 10:
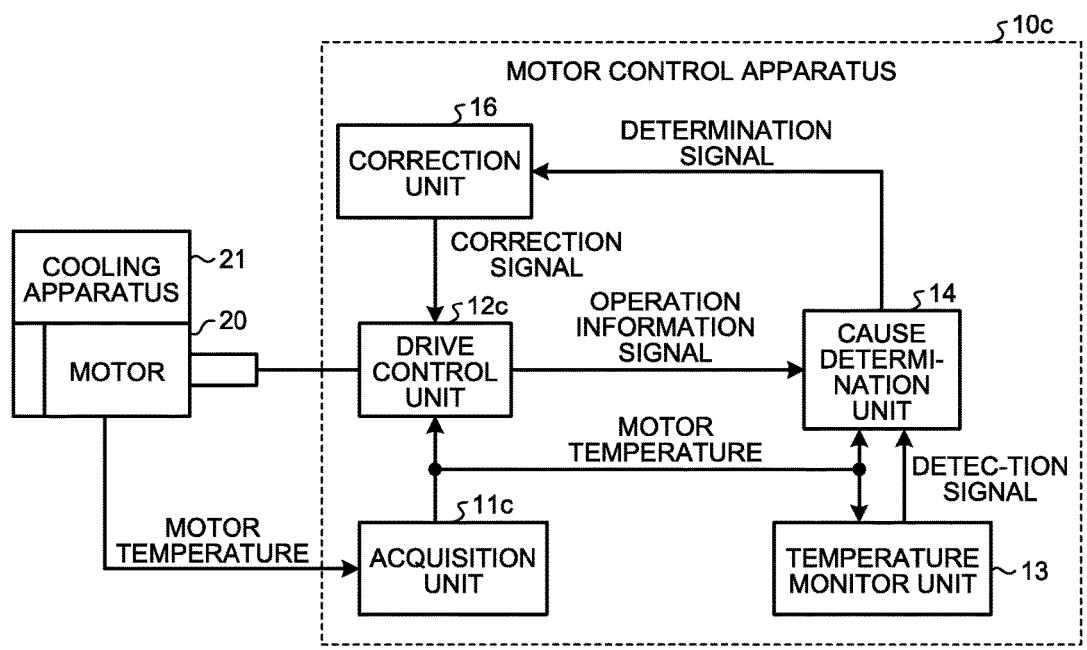
FIG. 10 is a block diagram illustrating the configuration of a motor control apparatus according to a third embodiment of the present invention.

FIG. 10 is a block diagram illustrating the configuration of a motor control apparatus 10c according to a third embodiment of the present invention. In FIG. 10, components identical or similar to those of the motor control apparatus 10 according to the first embodiment illustrated in FIG. 1 are designated with identical symbols. In FIG. 10, a correction unit 16 is included in place of the display unit 15 as a component of the motor control apparatus 10c in comparison with FIG. 1. Thus, in FIG. 10, the display apparatus 30 is not illustrated. When the functions of the motor control apparatus 10c are realized by a computer, the functions of the motor control apparatus 10c are realized by the CPU 101 and the memory 102, as illustrated in FIG. 2.

Actions of an acquisition unit 11c and a drive control unit 12c are different and the correction unit 16 is added in the third embodiment in comparison with the first embodiment, and thus, description related to these actions will be mainly provided below.

The acquisition unit 11c, which is connected to a sensor that measures the temperature of the motor 20, acquires the motor temperature at each time. The acquisition unit 11c outputs the acquired motor temperature to the temperature monitor unit 13, the cause determination unit 14, and the drive control unit 12c.

The drive control unit 12c is connected to the motor 20 and drives the motor 20. The drive control unit 12c has the operating condition of the motor 20 set therein in advance by the operating program, and the drive control unit 12c controls the motor 20 such that the motor 20 is operated on the basis of the operating condition.

Additionally, the drive control unit 12c monitors the driving state of the motor 20 and the motor temperature. The drive control unit 12c has an overload determination threshold value and an overheat determination threshold value set therein. The overload determination threshold value and the overheat determination threshold value are values defined in accordance with the specifications of the motor 20 regardless of the operating condition and they are threshold values for protecting the motor 20 from overload and overheat. If the output, which is the product of the rotation speed and the torque of the motor 20, exceeds the overload determination threshold value, the drive control unit 12c determines that the motor 20 is overloaded and outputs a signal for interrupting the motor 20. If the motor temperature exceeds the overheat determination threshold value, the drive control unit 12c determines that the motor 20 is overheated and outputs a signal for interrupting the motor 20 similarly. Here, the drive control unit 12c determines the overload by using an instantaneous value of the output of the motor 20, although the drive control unit 12c may obtain a mean value or a cumulative value of the output of the motor 20 in a time width that is set in advance in the drive control unit 12c in accordance with the specifications of the motor 20 for the overload determination and use the resultant value for the determination. The drive control unit 12c may use a current of the motor 20 in place of the output of the motor 20 for the determination. The overload determination and the overheat determination determined by the drive control unit 12c are a determination for protecting the motor 20 from overload and overheat regardless of the operating condition. Thus, the purpose of the determination is different from that of the determination of heat generation performed by the temperature monitor unit 13 on the basis of the comparison with a reference operation.

The drive control unit 12c outputs the driving state, which is monitored by the drive control unit 12c, and the operating condition, which is set in the drive control unit 12c, as an operation information signal to the cause determination unit 14. Upon input of a correction signal from the correction unit 16, the drive control unit 12c also changes at least one of the operating condition, the overload determination threshold value, and the overheat determination threshold value.

The correction unit 16 outputs the correction signal to the drive control unit 12c on the basis of a determination signal input from the cause determination unit 14. The content of the correction signal varies with the determination result of the cause determination unit 14, that is, the cause of heat generation by the motor 20. When the result of the cause determination is "unsuitability of the operating condition", the correction signal is a signal for changing the operating condition. Specifically, the correction signal is a signal indicating a command to perform at least one of processing to reduce the output, processing to reduce the current, processing to reduce the acceleration, and processing to reduce acceleration/deceleration time constant. When the result of the cause determination is "degradation in cooling capacity" of the cooling apparatus 21, the correction signal is a signal for causing the drive control unit 12c to reduce the overload determination threshold value or the overheat determination threshold value set in the drive control unit 12c. When the result of the cause determination is "another cause", the correction signal is a signal for causing the drive control unit 12c to interrupt the motor 20.

Figure 11:
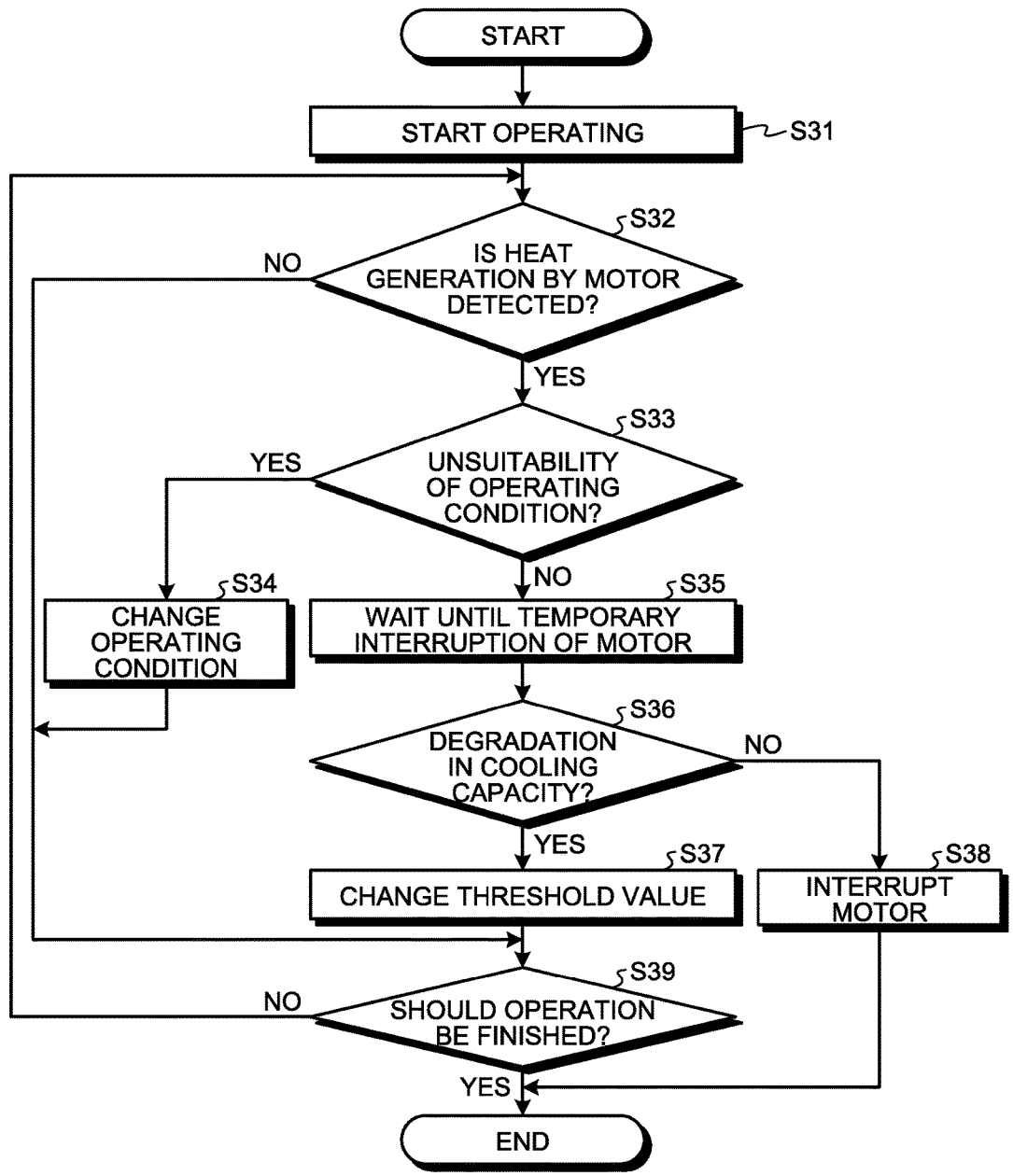
FIG. 11 is a flowchart illustrating processing performed by the motor control apparatus according to the third embodiment.

FIG. 11 is a flowchart illustrating processing performed by the motor control apparatus 10c according to the third embodiment.

First, in step S31, the drive control unit 12c causes the motor 20 to start operating on the basis of the operating condition.

Then, the temperature monitor unit 13 determines in step S32 whether heat generation by the motor 20 that is operating is detected. If heat generation by the motor 20 is detected (step S32: Yes), the flowchart proceeds to step S33. If heat generation by the motor 20 is not detected (step S32: No), the flowchart proceeds to step S39.

The cause determination unit 14 determines in step S33 whether the cause of the heat generation by the motor 20 is unsuitability of the operating condition in the drive control unit 12c on the basis of the driving state of the motor 20. If the cause determination unit 14 determines that the cause is the unsuitability of the operating condition (step S33: Yes), the flowchart proceeds to step S34. If the cause determination unit 14 determines that the cause is not the unsuitability of the operating condition (step S33: No), the flowchart proceeds to step S35.

Because it has been determined in step S33 that the cause of the heat generation by the motor 20 is the unsuitability of the operating condition, the correction unit 16 outputs in step S34 the correction signal for changing the operating condition to the drive control unit 12c, and the drive control unit 12c changes the operating condition on the basis of the correction signal. After step S34 is finished, the flowchart proceeds to step S39.

In order to determine whether the cooling capacity of the cooling apparatus 21 has degraded, the cause determination unit 14 waits in step S35 until the motor 20 is interrupted temporarily.

In step S36, the cause determination unit 14 determines, during a temporary interruption of the motor 20 and on the basis of the motor temperature, whether the cause of the heat generation by the motor 20 is the degradation in the cooling capacity of the cooling apparatus 21. If the cause determination unit 14 determines that the cause is the degradation in cooling capacity (step S36: Yes), the flowchart proceeds to step S37. If the cause determination unit 14 determines that the cause is not the degradation in cooling capacity (step S36: No), the flowchart proceeds to step S38.

Because it has been determined in step S36 that the cause of the heat generation by the motor 20 is the degradation in cooling capacity of the cooling apparatus 21, the correction unit 16 outputs in step S37 the correction signal for changing the overload determination threshold value or the overheat determination threshold value to the drive control unit 12c, and the drive control unit 12c changes at least any one of the two threshold values on the basis of the correction signal. After step S37 is finished, the flowchart proceeds to step S39.

Because it has been determined that the cause of the heat generation by the motor 20 is not "unsuitability of the operating condition" or "degradation in cooling capacity" of the cooling apparatus 21 but that the cause is "another cause", the drive control unit 12c interrupts the motor 20 in step S38 such that the operation is finished.

The drive control unit 12c determines in step S39 whether to cause the motor 20 to finish operating. If the drive control unit 12c causes the motor 20 to finish operating (step S39: Yes), the processing is finished. If the drive control unit 12c causes the motor 20 to continue operating (step S39: No), the flowchart returns to step S32, where the temperature monitor unit 13 determines again whether heat generation by the motor 20 is detected.

In the processing in step S36, where the cause determination unit 14 determines, during a temporary interruption of the motor 20, whether the cooling capacity of the cooling apparatus 21 has degraded, if the motor 20 is not temporarily interrupted longer than the cooling-apparatus determination time width during the operation, the next processing is performed without performing the determination in step S36. That is, a branch is provided before step S36. In this branch, if the motor 20 is not temporarily interrupted longer than the cooling-apparatus determination time width during the operation, processing is performed in which the cause determination unit 14 determines whether the cooling capacity has degraded after the finish of the operation in step S39 and, furthermore, if it is determined that the cause is the degradation in cooling capacity, processing is performed in which the drive control unit 12c changes one of the threshold values. If the motor 20 is temporarily interrupted longer than the cooling-apparatus determination time width, processing is performed in which the cause determination unit 14 determines whether the cooling capacity has degraded during the temporary interruption in accordance with FIG. 11. If it is determined that the cause of the heat generation by the motor 20 is the degradation in cooling capacity of the cooling apparatus 21 after the operation is finished, the drive control unit 12c starts the next operation with the overload determination threshold value or the overheat determination threshold value reduced in advance.

As described above, the motor control apparatus 10c according to the third embodiment is configured such that, when the temperature monitor unit 13 detects heat generation by the motor 20, the cause determination unit 14 determines the cause of the heat generation by the motor 20 and outputs a correction that corresponds to the determination result to the drive control unit 12c.

If it is determined that the cause of heat generation by the motor 20 is "unsuitability of the operating condition," the motor control apparatus 10c according to the third embodiment changes the operating condition of the motor 20 and thus can inhibit heat generation by the motor 20 itself. If it is determined that the cause of the heat generation by the motor 20 is "degradation in cooling capacity" of the cooling apparatus 21, the drive control unit 12c reduces the overload determination threshold value or the overheat determination threshold value. That is, the drive control unit 12c can operate to protect the motor 20 in accordance with the degradation in cooling capacity.

As described above, the motor control apparatus 10c according to the third embodiment can determine the cause of heat generation by the motor 20 and automatically change the operating action in accordance with the determined cause of the heat generation.

In the motor control apparatus 10c according to the third embodiment, the content of the correction signal is not limited to those in the description of the correction unit 16 and it is satisfactory if the correction signal is a signal for changing an action of the drive control unit 12c in accordance with the cause of heat generation as appropriate. In the description provided above, when the cause determination unit 14 determines that the cause of heat generation by the motor 20 is the degradation in cooling capacity of the cooling apparatus 21, the correction unit 16 outputs the correction signal that provides an instruction to reduce the overload determination threshold value or the overheat determination threshold value, although a correction signal having other information, specifically a correction signal that provides an instruction to extend a temporary interruption time during the operation, may be output.

The flowchart in FIG. 11 indicates that the order of the processing to determine the cause is performed first with a determination of whether the operating condition is unsuitable, and then with a determination of whether the cooling capacity has degraded. The order in which the determination of the cause of heat generation is performed by the motor control apparatus 10c according to the third embodiment is not limited to that illustrated in FIG. 11, and a similar effect can be produced when the order of the determination is reversed and a correction signal is issued in accordance with the cause of heat generation. Furthermore, the number of determination results of the cause of heat generation does not need to be only one, and the flowchart may proceed to step S35 regardless of the determination result in step S33 to also determine whether the cooling capacity has degraded, whereby the motor control apparatus 10c may determine that there are multiple causes of heat generation, i.e., "unsuitability of the operating condition" and "degradation in cooling capacity" and perform multiple countermeasures.

Fourth Embodiment

Figure 12:
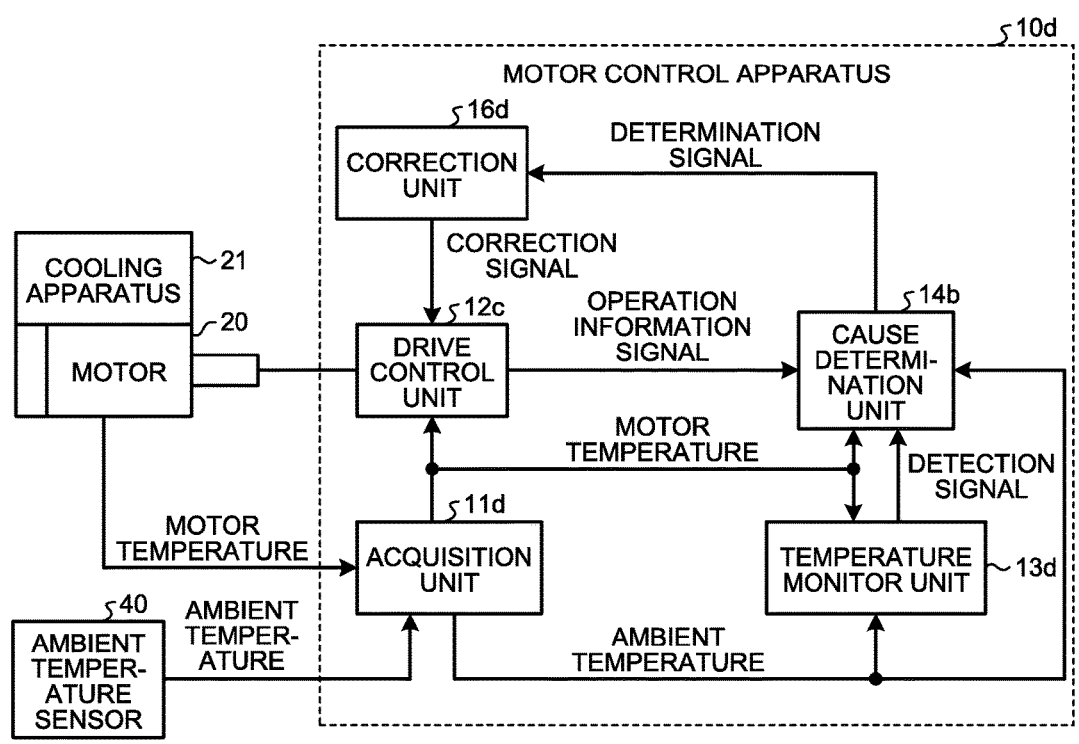
FIG. 12 is a block diagram illustrating the configuration of a motor control apparatus according to the fourth embodiment of the present invention.

FIG. 12 is a block diagram illustrating the configuration of a motor control apparatus 10d according to a fourth embodiment of the present invention. In FIG. 12, components identical or similar to those of the motor control apparatus 10b according to the second embodiment illustrated in FIG. 5 and the motor control apparatus 10c according to the third embodiment illustrated in FIG. 10 are designated with identical symbols. In the motor control apparatus 10d in FIG. 12, the ambient temperature sensor 40 is provided as an addition to the motor control apparatus 10c illustrated in FIG. 10. The ambient temperature sensor 40 is connected to the motor control apparatus 10d. When the functions of the motor control apparatus 10d are realized by a computer, the functions of the motor control apparatus 10d are realized by the CPU 101 and the memory 102, as illustrated in FIG. 2.

Actions of an acquisition unit 11d, a temperature monitor unit 13d, and a correction unit 16d are different in the fourth embodiment from those in the second and third embodiments, and thus, description related to these actions will be mainly provided below.

The acquisition unit 11d, which is connected to a sensor that measures the temperature of the motor 20 and to the ambient temperature sensor 40, acquires the motor temperature and ambient temperature at each time. The acquisition unit 11d outputs the acquired motor temperature to the drive control unit 12c, the temperature monitor unit 13d, and the cause determination unit 14b. The acquisition unit 11d also outputs the acquired ambient temperature to the temperature monitor unit 13d and the cause determination unit 14b.

The temperature monitor unit 13d monitors the motor temperature and the ambient temperature, acquired by the acquisition unit 11d, of the motor 20 during the operation and outputs a detection signal to the cause determination unit 14b if heat generation by the motor 20 is detected. The temperature monitor unit 13d has a heat-generation detection threshold value set therein. The temperature monitor unit 13d calculates the difference between the ambient temperature and the motor temperature and compares the resultant difference to the heat-generation detection threshold value. If the difference between the ambient temperature and the motor temperature exceeds the heat-generation detection threshold value, the temperature monitor unit 13d determines that the motor 20 has generated heat and outputs the detection signal to the cause determination unit 14b. In place of the difference between the ambient temperature and the motor temperature, the temperature monitor unit 13d may use the time rate of change of the difference and compare it to a threshold value in heat generation detection of the motor 20.

The correction unit 16d outputs a correction signal to the drive control unit 12c on the basis of a determination signal input from the cause determination unit 14b. In addition to the types of the correction signals described in the third embodiment, types of the correction signals as described below are added in accordance with the determination results of the cause determination unit 14b described in the second embodiment, that is, the causes of heat generation by the motor 20. When the result of the cause determination is "change in ambient environment" of the motor 20, the correction signal is a signal that instructs the drive control unit 12c to limit the output of the motor 20 or the maximum value of the current. When the result of the cause determination is "deterioration" of the main body of the motor 20, the correction signal is a signal that instructs the drive control unit 12c to interrupt the motor 20.

FIG. 13 is a flowchart illustrating processing performed by the motor control apparatus 10d according to the fourth embodiment.

First, in step S41, the drive control unit 12c causes the motor 20 to start operating on the basis of the operating condition.

Then, the temperature monitor unit 13d determines in step S42 whether heat generation by the motor 20 that is operating is detected. If heat generation by the motor 20 is detected (step S42: Yes), the flowchart proceeds to step S43. If heat generation by the motor 20 is not detected (step S42: No), the flowchart proceeds to step S51.

The cause determination unit 14b determines in step S43 whether the cause of the heat generation by the motor 20 is the change in ambient environment of the motor 20 on the basis of the ambient temperature. If the cause determination unit 14b determines that the cause is the change in ambient environment of the motor 20 (step S43: Yes), the flowchart proceeds to step S44. If the cause determination unit 14b determines that the cause is not the change in ambient environment of the motor 20 (step S43: No), the flowchart proceeds to step S45.

Because it has been determined in step S43 that the cause of the heat generation by the motor 20 is the change in ambient environment of the motor 20, the correction unit 16d outputs in step S44 a signal that provides an instruction to limit the output of the motor 20 or the maximum value of the current to the drive control unit 12c. After step S44 is finished, the flowchart proceeds to step S51.

The cause determination unit 14b determines in step S45 whether the cause of the heat generation by the motor 20 is the unsuitability of the operating condition in the drive control unit 12c on the basis of the driving state of the motor 20. If the cause determination unit 14b determines that the cause is the unsuitability of the operating condition (step S45: Yes), the flowchart proceeds to step S46. If the cause determination unit 14b determines that the cause is not the unsuitability of the operating condition (step S45: No), the flowchart proceeds to step S47.

Because it has been determined in step S45 that the cause of the heat generation by the motor 20 is the unsuitability of the operating condition, the correction unit 16d outputs in step S46 the correction signal for changing the operating condition to the drive control unit 12c, and the drive control unit 12c changes the operating condition on the basis of the correction signal. After step S46 is finished, the flowchart proceeds to step S51.

In order to determine whether the cooling capacity of the cooling apparatus 21 has degraded, the cause determination unit 14b waits in step S47 until the motor 20 is interrupted temporarily.

In step S48, the cause determination unit 14b determines, during a temporary interruption of the motor 20 and on the basis of the motor temperature, whether the cause of the heat generation by the motor 20 is the degradation in cooling capacity of the cooling apparatus 21. If the cause determination unit 14b determines that the cause is the degradation in cooling capacity (step S48: Yes), the flowchart proceeds to step S49. If the cause determination unit 14b determines that the cause is not the degradation in cooling capacity (step S48: No), the flowchart proceeds to step S50.

Because it has been determined in step S48 that the cause of the heat generation by the motor 20 is the degradation in cooling capacity of the cooling apparatus 21, the correction unit 16d outputs in step S49 the correction signal for changing the overload determination threshold value or the overheat determination threshold value to the drive control unit 12c, and the drive control unit 12c changes at least any one of the two threshold values on the basis of the correction signal. After step S49 is finished, the flowchart proceeds to step S51.

Because it has been determined that the cause of the heat generation by the motor 20 is not "change in ambient environment", "unsuitability of the operating condition", or "degradation in cooling capacity" of the cooling apparatus 21 but that the cause is "deterioration" of the main body of the motor 20, the drive control unit 12c interrupts the motor 20 in step S50 such that the operation is finished.

The drive control unit 12c determines in step S51 whether to cause the motor 20 to finish operating. If the drive control unit 12c causes the motor 20 to finish operating (step S51: Yes), the motor control apparatus 10d finishes the processing. If the drive control unit 12c causes the motor 20 to continue operating (step S51: No), the flowchart returns to step S42, where the temperature monitor unit 13d determines again whether heat generation by the motor 20 is detected.

In the processing in step S48, where the cause determination unit 14b determines, during a temporary interruption of the motor 20, whether the cooling capacity of the cooling apparatus 21 has degraded, if the motor 20 is not temporarily interrupted longer than the cooling-apparatus determination time width during the operation, the next processing is performed without performing the determination in step S48. That is, a branch is provided before step S48. In this branch, if the motor 20 is not temporarily interrupted longer than the cooling-apparatus determination time width during the operation, processing is performed in which the cause determination unit 14b determines whether the cooling capacity has degraded after the finish of the operation in step S51 and, furthermore, if it is determined that the cause is the degradation in cooling capacity, processing is performed in which the drive control unit 12c changes one of the threshold values. If the motor 20 is temporarily interrupted longer than the cooling-apparatus determination time width, processing is performed in which the cause determination unit 14b determines whether the cooling capacity has degraded during the temporary interruption in accordance with FIG. 13. If it is determined that the cause of the heat generation by the motor 20 is the degradation in cooling capacity of the cooling apparatus 21 after the operation is finished, the drive control unit 12c starts the next operation with the overload determination threshold value or the overheat determination threshold value reduced in advance.

As described above, the motor control apparatus 10d according to the fourth embodiment has a configuration to acquire the ambient temperature from the ambient temperature sensor 40 in addition to the configuration of the motor control apparatus 10c according to the third embodiment. Thus, the motor control apparatus 10d according to the fourth embodiment produces effects to be described below.

Because the motor control apparatus 10d acquires the ambient temperature, it can perform the determination with "change in ambient environment" of the motor 20 and "deterioration" of the main body of the motor 20 as candidates for determination results of the cause of heat generation by the motor 20 in addition to the determination results obtained by the cause determination performed in the third embodiment. This enables further detailed determination in comparison with the motor control apparatus 10c according to the third embodiment. Thus, the motor control apparatus 10d can change an action in accordance with the cause of heat generation by the motor 20 more appropriately.

Additionally, the cause determination unit 14b performs the determination of the cause of heat generation by the motor 20 starting with the cause of heat generation that can be determined easily with the motor 20 operating without being interrupted unnecessarily while it is operating; thus, the time taken for the entire determination can be reduced as much as possible.

Additionally, in the fourth embodiment, the temperature monitor unit 13d is configured to use the ambient temperature in addition to the motor temperature for the detection of heat generation by the motor 20, although the temperature monitor unit 13d may monitor only the motor temperature to detect heat generation by the motor 20 as is the case with the temperature monitor unit 13 according to the first to third embodiments.

In the motor control apparatus 10d according to the fourth embodiment, the content of the correction signal is not limited to those in the description of the correction unit 16d, and it is satisfactory if the correction signal is a signal for changing an action of the drive control unit 12c in accordance with the cause of heat generation as appropriate. In the description provided above, when the cause determination unit 14b determines that the cause of heat generation by the motor 20 is the change in ambient environment of the motor 20, the correction unit 16d outputs the correction signal that provides an instruction to limit the output of the motor 20 or the maximum value of the current, although a correction signal having other information, specifically a correction signal that provides an instruction to reduce a control gain of the motor 20, may be output.

The flowchart in FIG. 13 indicates that the order of the processing to determine the cause is performed first with a determination of whether the ambient environment of the motor 20 has changed, then with a determination of whether the operating condition is unsuitable, and then with a determination of whether the cooling capacity has degraded. The order in which the determination of the cause of heat generation is performed by the motor control apparatus 10d according to the fourth embodiment is not limited to that illustrated in FIG. 13, and the order of the determination may be changed. Furthermore, the number of determination results of the cause of heat generation does not need to be only one, and step S45 may be performed regardless of the result in step S43 to determine that multiple causes of heat generation have occurred and perform multiple countermeasures. In other words, the motor control apparatus 10d may determine any one or more of "change in ambient environment", "unsuitability of the operating condition", and "degradation in cooling capacity", or "deterioration" of the main body of the motor 20 as a cause or causes of heat generation by the motor 20 and perform multiple countermeasures.

With the configurations of the first to fourth embodiments described above, the cause of heat generation by the single motor 20 is determined, although the motor temperatures of motors 20 may be acquired while the motors 20 are being driven and the cause of heat generation by each of the motors 20 may be determined. Furthermore, the configurations of the first to fourth embodiments may be applied regardless of the form and cooling method of the cooling apparatus 21.

Note that the configurations described in the foregoing embodiments are examples of the present invention, and combining the present invention with other publicly known techniques is possible, and partial omissions and modifications of the configurations are possible without departing from the spirit of the present invention.

REFERENCE SIGNS LIST 10, 10b, 10c, 10d motor control apparatus, 11, 11b, 11c, 11d acquisition unit, 12, 12c drive control unit, 13, 13d temperature monitor unit, 14, 14b cause determination unit, 15, 15b display unit, 16, 16d correction unit, 20 motor, 21 cooling apparatus, 30 display apparatus, 40 ambient temperature sensor, 50 motor ambient environment, 60 schematic diagram field, 70 message field, 101 CPU, 102 memory.

The invention claimed is:

1. A motor control apparatus that controls a motor equipped with a cooling apparatus, the motor control apparatus comprising:
   a processor to execute a program; and
   a memory to store the program which, when executed by the processor, performs
   an acquisition process of acquiring a temperature of the motor;
   a drive control process of driving the motor and outputting a driving state and an operating condition of the motor as an operation information signal; and
   a cause determination process of determining, on a basis of the temperature of the motor and the operation information signal, at least one of a plurality of causes of heat generation as a cause of heat generation by the motor.

2. The motor control apparatus according to claim 1, wherein the cause determination process includes determining that one or both of unsuitability of the operating condition and degradation in cooling capacity of the cooling apparatus are the cause of the heat generation by the motor or determining that another cause is the cause of the heat generation by the motor.

3. The motor control apparatus according to claim 1, wherein
   the acquisition process further includes acquiring an ambient temperature of the motor, and
   the cause determination process includes determining, further on a basis of the ambient temperature, that at least one of unsuitability of the operating condition, degradation in cooling capacity of the cooling apparatus, and change in ambient environment of the motor is the cause of the heat generation by the motor or determining that deterioration of a main body of the motor is the cause of the heat generation by the motor.

4. The motor control apparatus according to claim 3, wherein the cause determination process includes
   determining, on a basis of an output or a current of the motor during operation, whether the cause of the heat generation is the unsuitability of the operating condition,
   determining, on a basis of a temperature of the motor during an interruption or on a basis of the temperature of the motor during an interruption and the ambient temperature, whether the cause of the heat generation is the degradation in cooling capacity, and
   determining, on a basis of the ambient temperature, whether the cause of the heat generation is the change in ambient environment.

5. The motor control apparatus according to claim 1, wherein the program which, when executed by the processor, further performs a display process of outputting, to a display apparatus, information related to a determination of the cause of the heat generation as a display signal.

6. The motor control apparatus according to claim 5, wherein the display signal is a signal that includes at least one of information related to a determination status in the cause determination process, information related to a determination result in the cause determination process, and information related to a countermeasure that corresponds to the cause of the heat generation.

7. The motor control apparatus according to claim 1, wherein the program which, when executed by the processor, further performs a correction process of outputting, for the drive control process, a correction signal corresponding to the cause of the heat generation.

8. The motor control apparatus according to claim 1, wherein the program which, when executed by the processor, further performs a temperature monitor process of outputting a detection signal for the cause determination process when heat generation by the motor is detected on a basis of the temperature of the motor, wherein
   the cause determination process includes determining the cause of the heat generation upon receipt of the detection signal.

* * * * *